(12) United States Patent
Chen et al.

(10) Patent No.: US 11,593,452 B1
(45) Date of Patent: Feb. 28, 2023

(54) EXPERIMENT SYSTEM INTEGRATION SERVICE

(71) Applicant: Optimizely, Inc., San Francisco, CA (US)

(72) Inventors: Yeeland Chen, Austin, TX (US);
Travis Beck, San Francisco, CA (US);
Arun Dharumar, Dublin, CA (US);
Byron Jones, San Francisco, CA (US);
Claire Vo, San Francisco, CA (US)

(73) Assignee: Optimizely, Inc., San Francisco, CA (US)

( * ) Notice: Subject to any disclaimer, the term of this patent is extended or adjusted under 35 U.S.C. 154(b) by 322 days.

(21) Appl. No.: 16/568,554

(22) Filed: Sep. 12, 2019

(51) Int. Cl.
| | |
|---|---|
| G06F 16/955 | (2019.01) |
| G06F 16/9035 | (2019.01) |
| G06F 16/958 | (2019.01) |
| G06F 16/9535 | (2019.01) |
| G06F 9/54 | (2006.01) |
| H04L 9/32 | (2006.01) |

(52) U.S. Cl.
CPC ............ G06F 16/972 (2019.01); G06F 9/541 (2013.01); G06F 16/9035 (2019.01); G06F 16/955 (2019.01); G06F 16/9535 (2019.01); H04L 9/3213 (2013.01)

(58) Field of Classification Search
CPC .... G06F 16/972; G06F 9/541; G06F 16/9035; G06F 16/9535; G06F 16/955; H04L 9/3213
See application file for complete search history.

(56) References Cited

U.S. PATENT DOCUMENTS

| | | | |
|---|---|---|---|
| 2014/0304756 A1* | 10/2014 | Fletcher | H04N 21/2387 725/115 |
| 2017/0223057 A1* | 8/2017 | Amiri | H04L 67/306 |
| 2019/0294527 A1* | 9/2019 | Teitelbaum | H04L 63/083 |

* cited by examiner

*Primary Examiner* — Syed H Hasan
*Assistant Examiner* — Chongsuh Park
(74) *Attorney, Agent, or Firm* — Womble Bond Dickinson (US) LLP

(57) ABSTRACT

A method comprises receiving a first outbound request, from an internal user account of an internal platform, indicating a first action to be performed by a first third-party user account of a first third-party platform. In response to authenticating the first outbound request, the method further comprises sending an application programming interface (API) request to the first third-party platform to perform the first action on the first third-party platform on behalf of the internal user account. The method further comprises receiving a first inbound request, from the first third-party user account, indicating a second action to be performed on behalf of the internal user account on the internal platform. In response to authenticating the first inbound request, the method further comprises sending an internal request to the internal platform to perform the second action on the internal platform on behalf of the first third-party user account.

16 Claims, 10 Drawing Sheets

EXPERIMENT SYSTEM INTEGRATION SERVICE

FIELD OF TECHNOLOGY

The embodiments described herein pertain in general to a third-party integration service and more particularly to a third-party experiment system integration service.

BACKGROUND

Content variation testing is a type of experiment that tests changes to content against a current version of the content. One example of content variation testing is web page variation testing where an experiment is conducted that tests a web page (or one or more elements on the page) against another design of the web page (or one or more variations of the elements on the page). During variation testing of a web page, user interaction with a web page or its variations is measured (for example, whether a user clicks on a button or a variation of a button), and the effects of the modifications to a web page (or its elements) that produce positive or negative results are determined. The positive results associated with a particular modification to a web page validates that the modification to the web page should be used in a production version of the web page. A variety of internal and external platforms may be used in conjunction for variation testing of a web page.

The FIGURES depict an embodiment for purposes of illustration only. One skilled in the art will readily recognize from the following description that alternative embodiments of the structures and methods illustrated herein may be employed without departing from the principles described herein.

DETAILED DESCRIPTION

Content providers may run content experiments such as A/B tests (e.g., variation testing) to answer specific questions regarding which variation of a content item such as a web page or digital product (including various features) is more successful. Many content experiments include visitor criteria that determines whether a visitor is eligible for the experiment and if so, which variations of the content experiment should be shown to the visitor. The systems that implement these content experiments may be implemented in the backend of the content provider's system or as a separate node that communicates with the back end of the content provider's system. Simultaneously, content providers may bring up content delivery networks (CDNs) in the front-end of their systems to provide for content caching, including caching of content experiment variations.

In some embodiments, experiment systems are designed to work with third-party services. Examples of such services include as JIRA, Slack, Asana, Trello, and others. Advantageously, integration with third-party services provides flexibility and scalability to experiment systems and third-party services alike. Integration with third-party services may provide difficult in a variety of contexts. User credentials and actions may be difficult to maintain across a variety of services and platforms. Furthermore, providing a unified user experience across a variety of services and platforms may be challenging.

Advantageously, the embodiments described herein may provide for a seamless integration of user accounts across a variety of platforms and services, as well as provide a uniform user experience across each of the platforms and services. By providing these benefits and others, experimentation systems are provided more flexibility to perform operations otherwise not possible.

In some embodiments, the features described herein are made possible due to a third-party integration service (e.g., described as "Ambassador" for clarity and brevity herein). Ambassador may exist between platforms of an experimentation system, such as an experimentation platform and/or program management platform, and third-party services. Advantageously, Ambassador may serve as an intermediate authentication and translation layer to enable cross-compatibility between user accounts on a variety of platforms and services.

Figure 1:
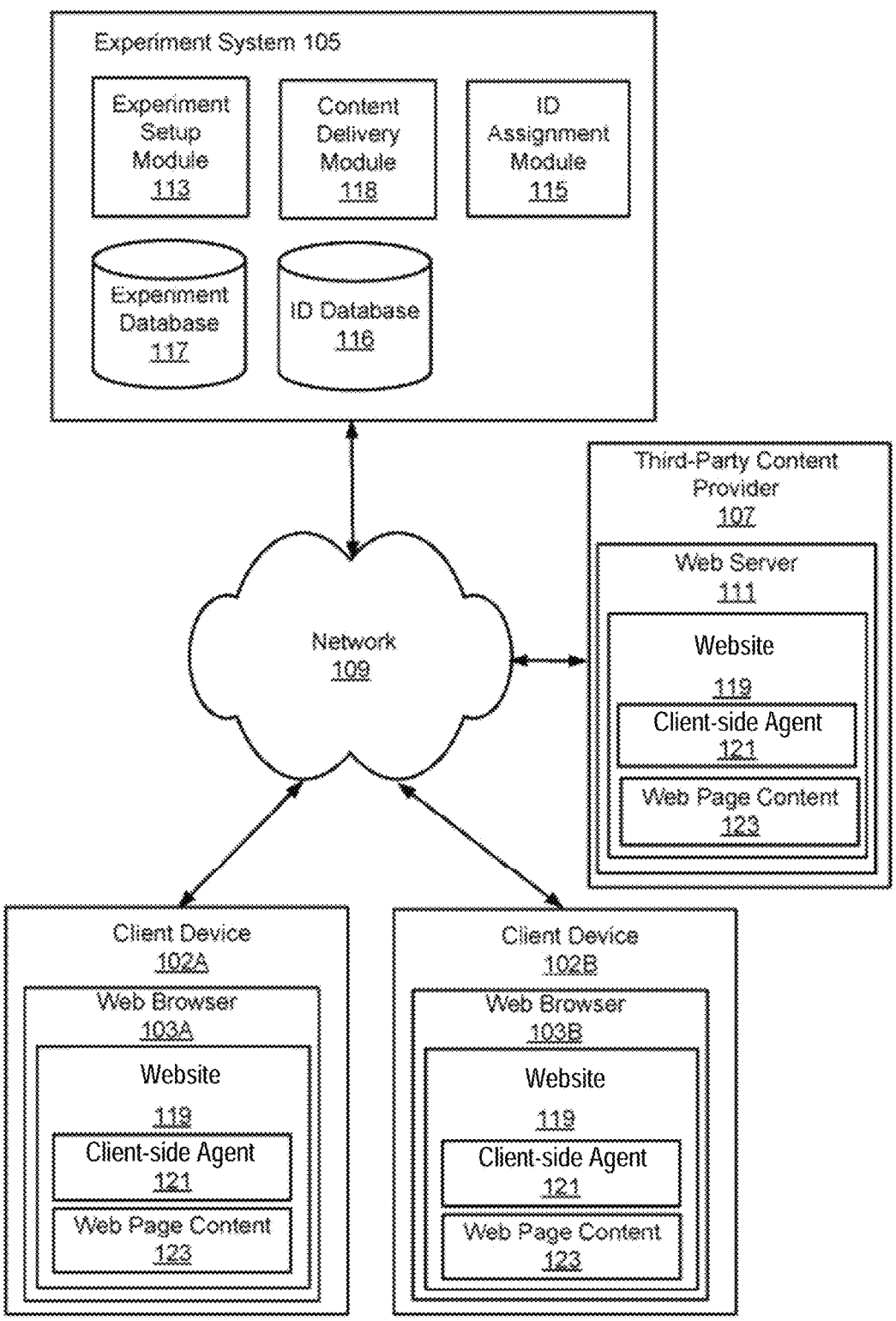
FIG. 1 is a block diagram of an experiment system environment, according to one embodiment.

FIG. 1 is a block diagram of a variant testing system environment 100 according to one embodiment. Environment 100 includes client devices 102 (e.g., client device 102A and client device 102B). In one embodiment, client device 102A is a device of a first user and client device 102B is a device of a second user. Client device 102A may represent one or more devices of the first user and client device 102B may represent one or more devices of the second user. Client devices 102 are connected to an experiment system 105 and a third-party content provider 107 via a network 109. In one embodiment, experiment system includes one or more experimentation platforms to configure experiments and/or program management platforms to manage the experiment system. Although the environment 100 shown in FIG. 1 only includes two client devices 102, the environment 100 can include any number of client devices (e.g., thousands of client devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

The network 109 enables communication among the entities connected to it. In one embodiment, network 109 is the Internet and uses standard communications technologies and/or protocols. Thus, network 109 can include links using technologies such as Ethernet, Wi-Fi (e.g., 802.11), worldwide interoperability for microwave access (WiMAX), 3G, Long Term Evolution (LTE), digital subscriber line (DSL), asynchronous transfer mode (ATM), InfiniBand, etc. Similarly, the networking protocols used on network 109 can include multiprotocol label switching (NIPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 109 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In one embodiment, network 109 may include but is not limited to any combination of a local area network (LAN), a metropolitan area network (MAN), and a wide area network (WAN). In another embodiment, the entities use custom and/or dedicated data communications technologies instead of, or in addition to, the ones described above.

Client devices 102 communicate with the third-party content provider 107 via the network 109 to receive content items such as web pages from the third-party content provider 107. In one embodiment, each client device 102 is a computer system capable of communicating with the experiment system 105 and the third-party content provider 107. Examples of client devices 102 include a personal computer, a mobile phone, a tablet, a personal digital assistant (PDA), or a laptop. As shown in FIG. 1, each client device 102 includes a web browser 103 (e.g., web browser 103A and web browser 103B). The web browser 103 is a computer program stored on a client device 102 that allows the user of client 102 to access web pages on the World Wide Web such as websites 119 provided by the third-party content provider 107. Suitable web browsers include, but are not limited to, GOOGLE CHROME, MICROSOFT INTERNET EXPLORER, MICROSOFT EDGE, MOZILLA FIREFOX, and APPLE SAFARI. In addition to web browsers, a client device may process a web page in an environment like NODE.JS, in which an experiment system and other third-party content providers may execute JavaScript code in an interpreter with support for microtask and macrotask queues.

As mentioned above, the environment 100 includes a third-party content provider 107. Hereinafter, the third-party content provider 107 is referred to as a "content provider 107" for ease of description. The content provider 107 may be an individual, a group of individuals, or an entity such as a company. In one embodiment, the content provider 107 provides content items to client devices 102. While only one content provider 107 is shown, it is understood that any number of content providers are supported and can be in the environment 100 at any time.

In one embodiment, the content items provided by the content provider 107 are included as part of a website 119. For example, the content provider 107 may provide content items such as navigation bars, backgrounds, call to action buttons, links, CSS styles, pop-ups, video, audio, a combination of video and audio, still images (e.g., JPEG), text documents, advertisements, and/or any other types of content. For purposes of convenience and the description of one embodiment, the content items provided by the content provider 107 will be referred to as a single-page web pages, but no limitation on the type of content items are intended by this terminology. In one embodiment, a single-page web page refers to a view of a website 119. For example, a single-page web page may be the initial view of a website 119 when the user first loads the website 119 or the view when the user navigates over a navigation bar element and a menu is displayed in response to the navigation over the navigation bar. In other embodiments, a single-page web page may refer to any other type of dynamic website or dynamic application.

In one embodiment, the content provider 107 operates in conjunction with the experiment system 105 to perform variation testing on a website 119 containing one or more single-page web pages. In one embodiment, the content provider 107 sends a single-page web page to client devices 102 together with a client-side experimentation agent 121, which includes or subsequently downloads from the experiment system 105 conditions and instructions for modifying the single-page web page. A variation test for a single-page web page of a website 119 tests changes to the single-page web page against the current variation of the single-page web page (e.g., the original version of the single-page web page) to determine how the variation alters user interaction with the web page or whether the changes produce a desired result. An example of a desired result resulting from a change to a single-page web page is an increased interaction with the web page such as an increased selection of an advertisement(s) included in the single-page web page or increased purchases of a product advertised on a single-page web page. Thus, variation testing validates a new design of a single-page web page or changes on elements on the single-page web page before the new design or changes are put into production by the content provider 107.

For a given single-page web page, the content provider 107 may have an associated smart page that includes one or more variations of the single-page web page that are used in a variation test for the single-page web page. In one embodiment, a variation test of a single-page web page involves an experiment that tests control "A" and a variation "B" on users requesting the single-page web page from the content provider 107. For ease of discussion, the embodiments discussed herein describe a web page having only two variations: the control and the variant. However, in other embodiments, a single page web page can have any number of variations.

Figure 2B:
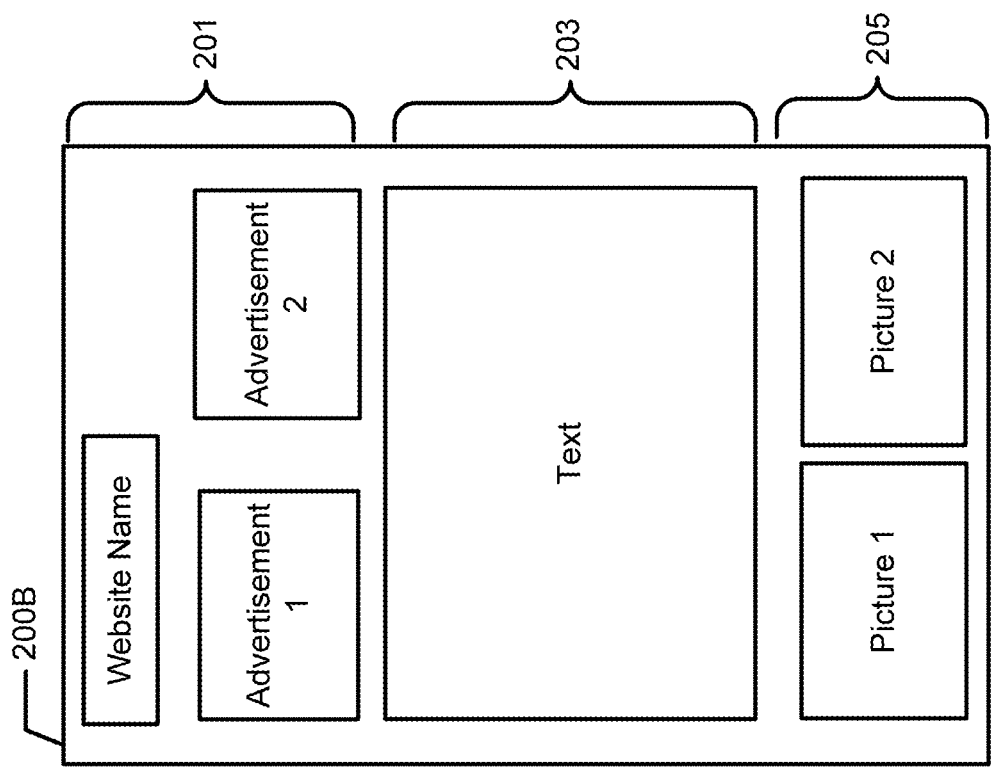
FIGS. 2A and 2B are example variations of a web page, according to one embodiment.
Figure 2A:
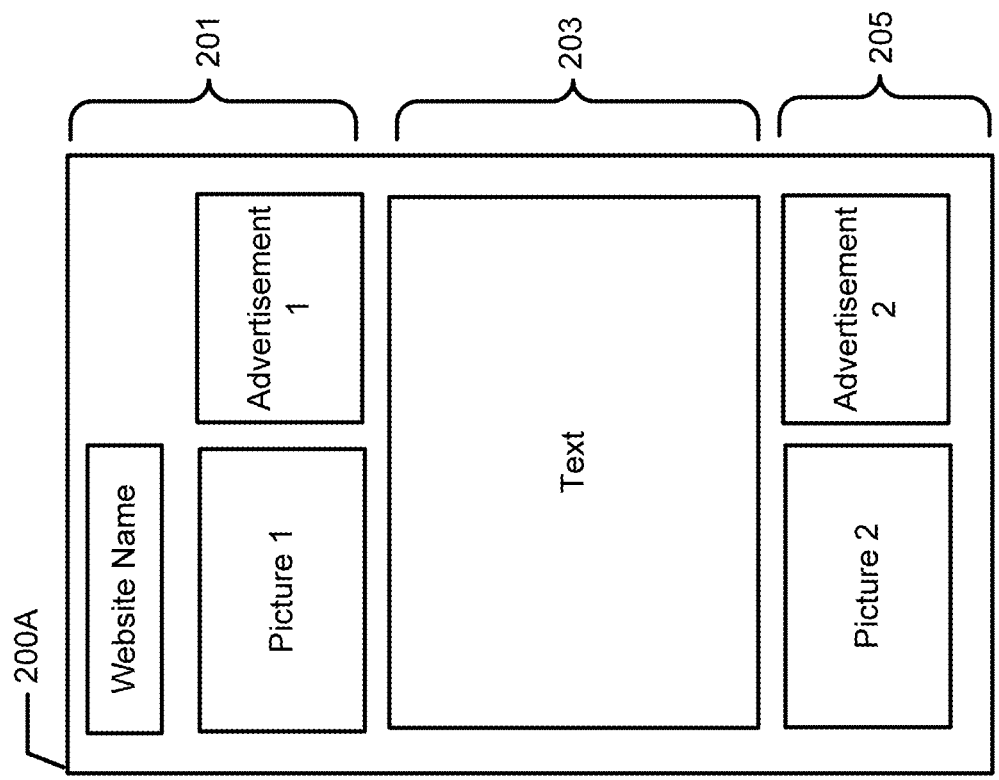

FIG. 2A is example "A" (e.g., the control) of a single-page web page 200A that represents the current implementation of the single-page web page provided by content provider 107. The control of the single-page web page 200A includes a website name of the website associated with the single-page web page, a first picture, and a first advertisement. The website name, the first picture, and the first advertisement are located in an upper portion 201 of the control of single-page web page 200A according to one embodiment. The control of single-page web page 200A also includes textual content located in a central portion 203 of the control of single-page web page 200A and the control of the single-page web page 200A also includes a second picture and a second advertisement located at a lower portion 205 of the control of the single-page web page 200A.

FIG. 2B is example "B" (e.g., the variant version) of a single-page web page 200B. The variant of the single-page web page represented by web page 200B includes a change (i.e., a modification) to the control of the single-page web page 200A shown in FIG. 2A. The variant of single-page web page 200B includes the website name, a first advertisement, a second advertisement, textual content, a first picture, and a second picture similar to the control of the single-page web page 200A shown in FIG. 2A. However, the variant of single-page web page 200B includes the second advertisement positioned in the upper portion 201 of single-page web page 200B whereas the second advertisement is positioned in the lower portion 205 in the control of the single-page web page 200A. In one embodiment, the variation test using the control and the variant of the single-page web page is conducted to determine whether the second advertisement receives more selections when the second advertisement is located at the lower portion 205 of the single-page web page as shown in FIG. 2A or when the second advertisement is located at the upper portion 201 of the single-page web page as shown in FIG. 2B.

Referring back to FIG. 1, in one embodiment the content provider 107 includes a web server 111. In one embodiment, the web server 109 links the content provider 107 to one or more client devices 102 and the experiment system 105 via the network 109. The web server 111 serves websites 119, as well as other web related content 123 for the website 119, such as Java, Flash, XML, and so forth. The web server 111 may include a mail server or other messaging functionality for receiving and routing messages between the experiment system 105 and one or more client devices 102. In one embodiment, a website 119 provided by the web server 109 may include a client-side experimentation agent 121. The client-side experimentation agent 121 may be added to the website 119 by the third-party content provider 107 in one embodiment. The client-side experimentation agent 121 comprises code that loads experiment variation instructions from the experiment system 105.

As shown in FIG. 1, the variant testing system environment 100 also includes an experiment system 105. In one embodiment, the experiment system 105 establishes and conducts variation experiments for web pages included in websites 119 served by third party providers 107. In one embodiment, the experiment system 105 includes an experiment setup module 113, an ID assignment module 115, an ID database 116, an experiment database 117, and a content delivery module 118, according to one embodiment. As is known in the art, the term "module" refers to computer program logic utilized to provide the specified functionality. Thus, a module can be implemented in hardware, firmware, and/or software. In one embodiment, program modules are stored on a non-transitory storage device (i.e., a computer program product), loaded into a memory, and executed by one or more computer processors. Additionally, those of skill in the art will recognize that other embodiments of the experiment system 105 shown in FIG. 1 can have different and/or other modules than the ones described here, and that the functionalities can be distributed among the modules in a different manner.

In one embodiment, the experiment setup module 113 establishes experiments for websites 119 provided by the third-party content provider 107. The experiment setup module 113 receives input from an affiliate (e.g., an employee) of the third-party content provider 107 to establish a variation experiment for a single-page web page of a website 119 provided by the third-party content provider 107. In one embodiment, establishing a variation experiment for a single-page web page of a website 119 includes configuring a smart page for the single-page web page. In one embodiment, a smart page for a single-page web page is a set of instructions that describe when to activate a variation experiment associated with the single-page web page. The smart page may include one or more triggers and one or more conditions configured by the affiliate of the third-party content provider 107 that impact when variations of the associated single-page web page are selected and presented to a client device 102.

A smart page for a single-page web page may define one or more conditions. In one embodiment, a condition(s) for a smart page is a set of rules related to the state of the single-page web page that must be satisfied before the smart page for the single-page web page will activate. That is, a condition of a smart page describes the state of the world of the single-page web page that can be evaluated as true (i.e., valid) or false (i.e., invalid). Responsive to a condition being true, a smart page causes the performance of a specified action. For example, information included in the smart page specifies when and how to present experimental variants of the website 119 to viewing users if a condition in the smart-page is true. If a condition is false, the smart page may be deactivated if the smart page is currently active or the smart page may not be activated if not currently activated.

In one embodiment, a smart page for the single-page web page may also include at least one trigger. In one embodiment, a trigger defines when to evaluate the condition(s) for the smart page. That is, a trigger of a smart page is tied to an event on the single-page web page and signals a client device 102 to evaluate conditions associated with the trigger. Smart pages may include one or more triggers that can be of different trigger types. When a trigger event occurs, the smart page evaluates the corresponding conditions associated with the trigger event.

Figure 3A:
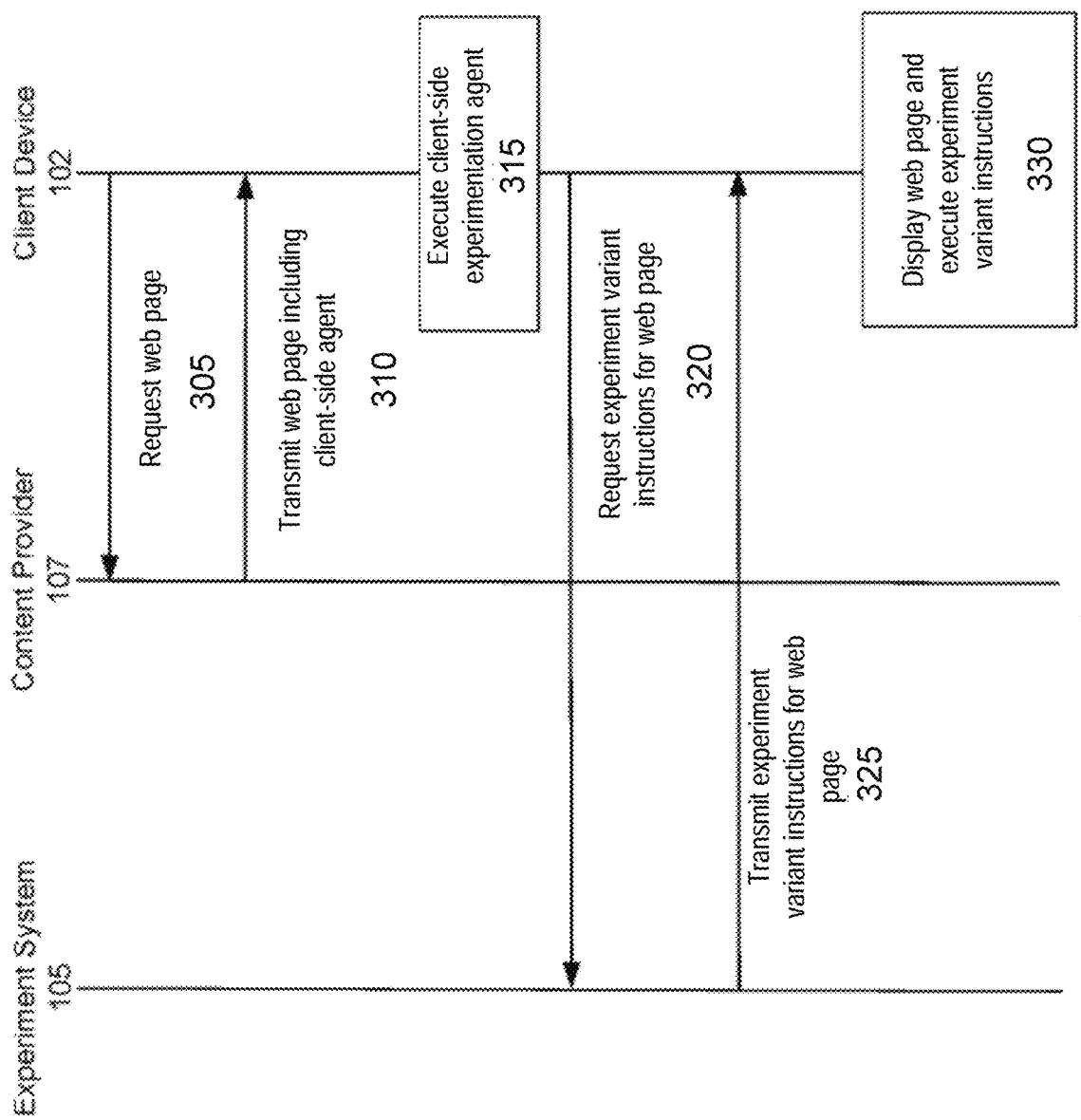
FIGS. 3A-3B are transaction diagrams illustrating interactions between an experiment system, a content provider, and a client device, according to one embodiment.
Figure 3B:
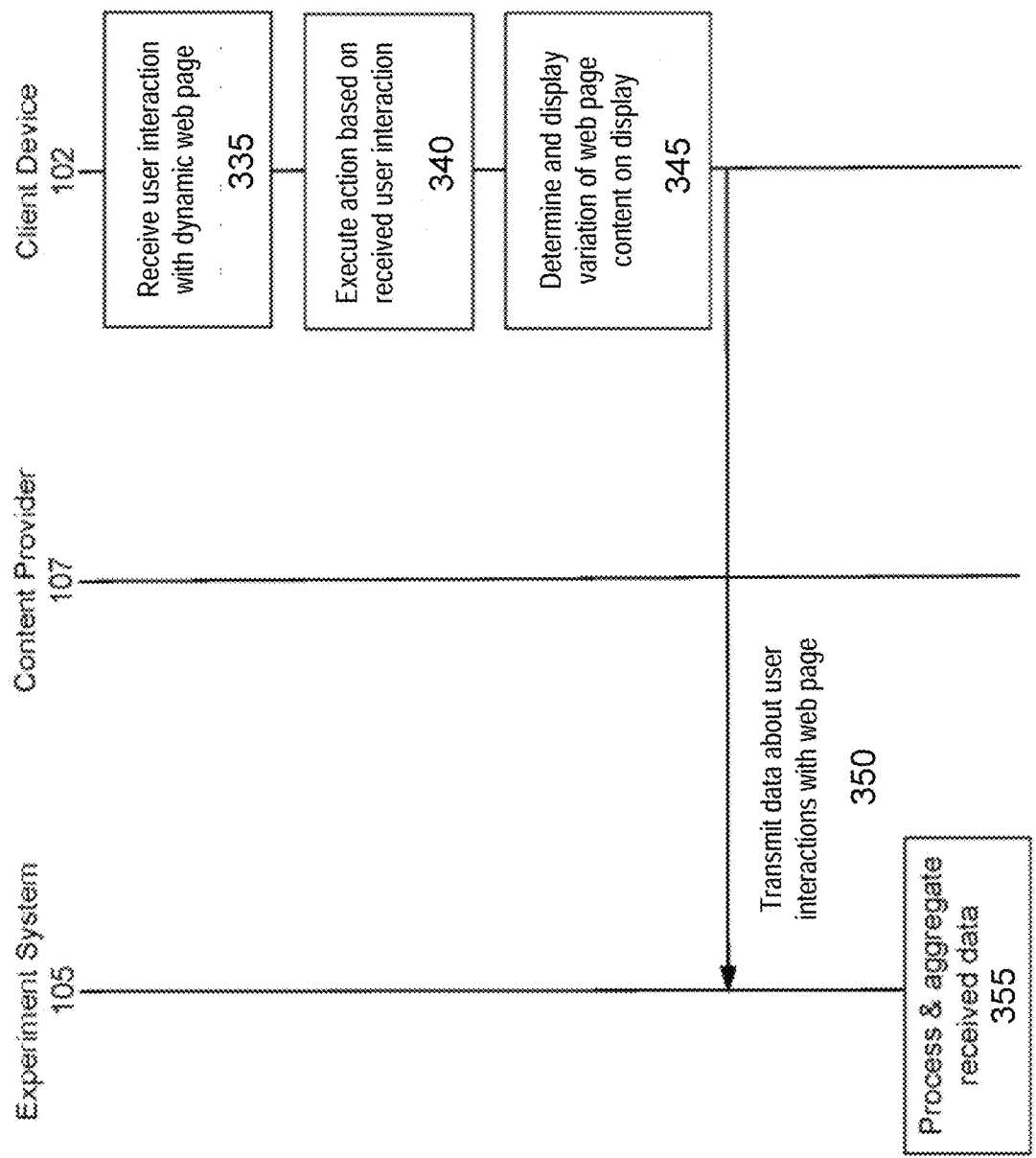

FIGS. 3A-3B are transaction diagrams illustrating interactions between an experiment system 105, a content provider 107, and a client device 102. In one embodiment, the experiment system 105 may be on the client device 102. In another embodiment, the experiment system 105 is separate from the client device 102, as shown. A client device 102 requests 305 a website 119 from a content provider 107. The content provider 107 transmits 310 the website 119 to the client device 102. The transmitted website 119 includes a client-side experimentation agent 121. The client-side experimentation agent 121 includes instructions that cause the client device 102 to retrieve from the experiment system 105 additional configurations or variations to perform alterations on the web page or its content (e.g., web page elements), including, in one embodiment, the triggers and conditions for one or more smart pages. The client device 102 executes 315 the client-side experimentation agent 121 which causes the client device 102 to request 320 instructions for executing experiment variants for a single-page web page of the website 119 from the experiment system 105. The experiment system 105 transmits 325 the experiment variant instructions for the single-page web page of the website 119 to the client device 102. The instructions include the triggers and conditions for the smart pages and where they are stored in the client-side experimentation agent 121 within the web browser 103. The client device 102 displays 330 the single-page web page to a user of the client device 102 and executes the web browser 103 and the client-side experimentation agent containing the experiment variant instructions.

The client-side experimentation agent 121 contains instructions to allow it to interact with the web browser 103, including instructions to interact with the web browser's APIs. For example, the client-side experimentation agent 121 contains instructions to interact with the MutationObserver API. The MutationObserver API provides the ability to watch for changes being made to the DOM tree by identifying a target element. The target element may be a single node in the DOM tree or a subtree including multiple nodes. When a change occurs to the identified target element, such as adding, modifying, and removing nodes or node attributes and modifying text data, additional code can be configured using the MutationObserver API to watch for changes and transmit them to the client-side experimentation agent 121. In another example, the client-side experimentation agent 121 interacts with a site visitor's web browser session history. In one example, the client-side experimentation agent 121 detects when a URL changes even if the full page does not reload in order to execute experiments.

Referring to FIG. 3B, the client device 102 receives 335 a user's interactions with the website 119 that has been loaded onto the browser running on the client device 102. For example, the client device 102 identifies a user interaction of clicking or selecting a menu item of the single-page web page and passes the user interaction to the browser for execution by the website 119. The client device 102 executes 340 an action associated with the user interaction in the browser. The action executed by the client device 102 includes, displaying the selected menu item (e.g., updating an element of the web page). The client device 102 determines 345 a variation of the single-page web page to display (e.g., including a variation of an element to display) to the user based on the experiment variant instructions and the user interactions. Responsive to the client device 102 displaying the determined variation of the single-page web page, the client device 102 using the client-side experimentation agent may monitor for changes to the state of the single page web application 119 and transmit 350 data about user interactions with the single-page web page to the experiment system 105. The experiment system 105 processes and aggregates 355 the received data.

Figure 4:
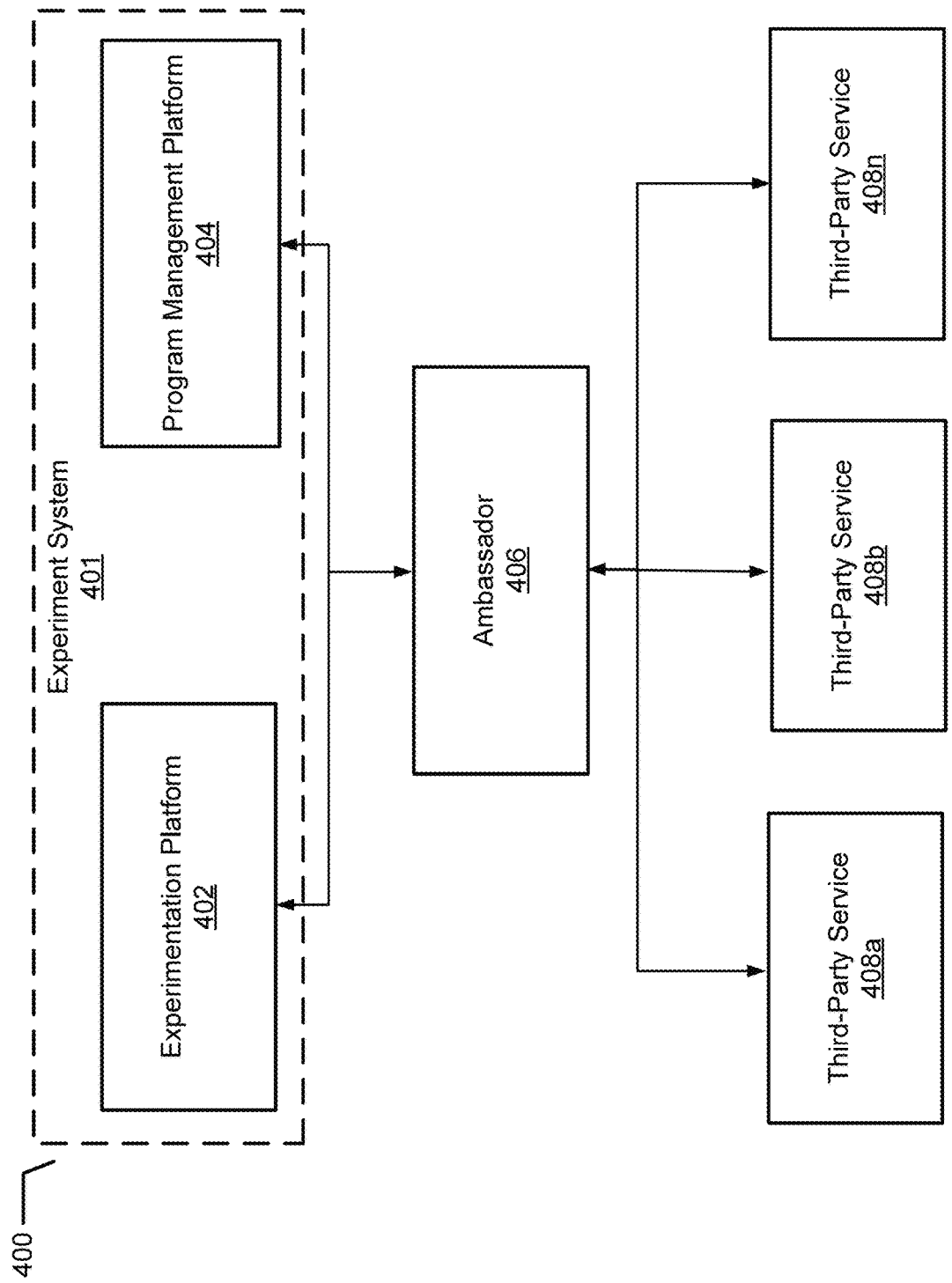
FIG. 4 is a block diagram of a third-party integration service environment, according to one embodiment.

FIG. 4 is a block diagram of a third-party integration service environment, according to one embodiment. In one embodiment, experiment system 401 is the same as, or similar to, experiment system 105 of FIG. 1. In one embodiment, experimentation platform 402 and program management platform 404 are platforms of experiment system 401. Ambassador 406 (e.g., a third-party integration service) may reside between experiment system 401 and one or more third-party services (e.g., 408a-n).

As described herein, Ambassador 406 may function as an intermediate authentication and translation layer to enable cross-compatibility between user accounts on the experimentation platform 402, program management platform 404, and third party services 408a, 408b, 408n, etc. Additional details describing such features are provided with respect to FIGS. 5-9.

Figure 5:
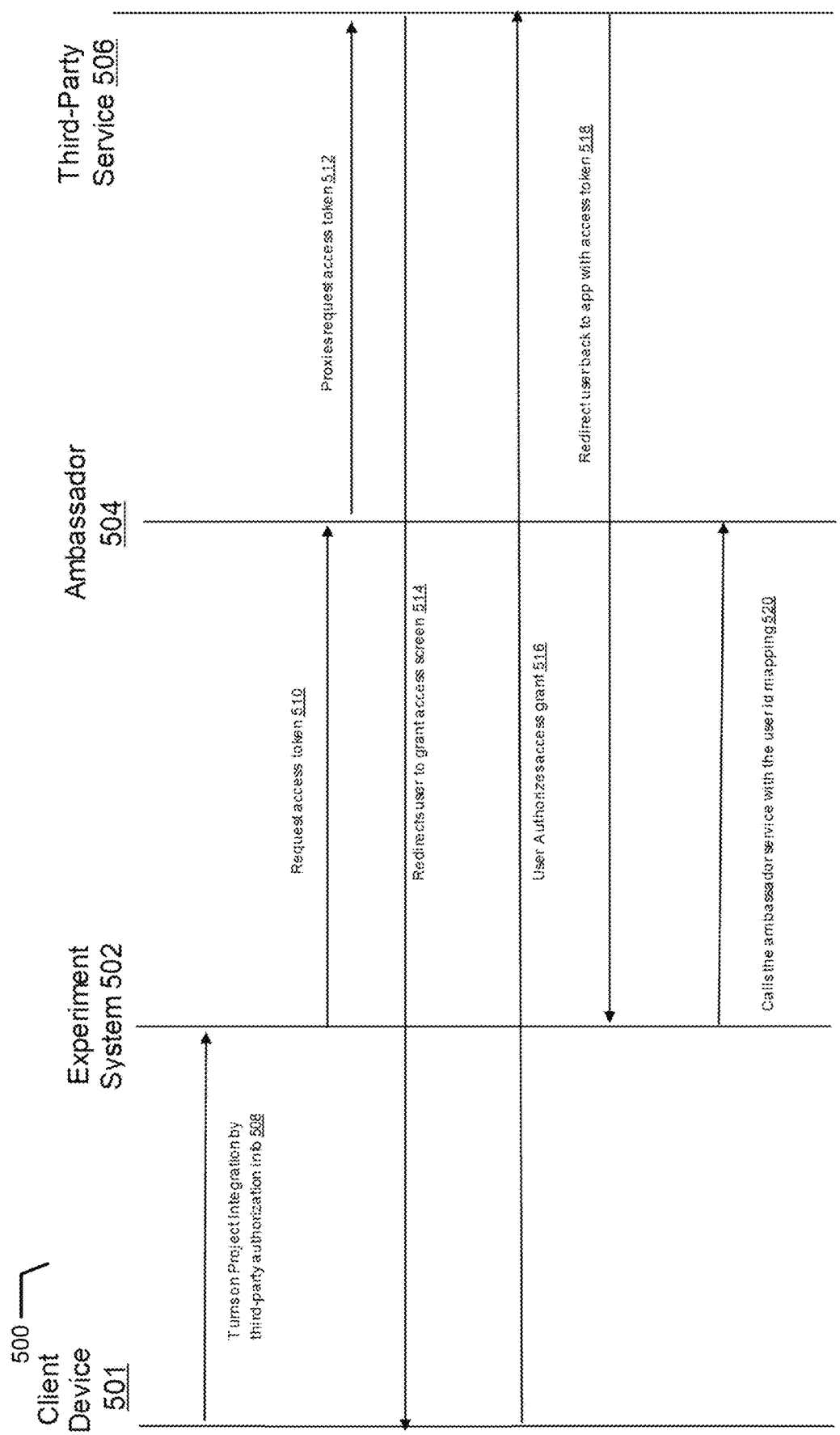
FIG. 5 is a transaction diagram illustrating interactions between an experimentation platform, a third-party integration service, and a third-party service, according to one embodiment.

FIG. 5 is a transaction diagram illustrating interactions 500 between an experimentation platform, a third-party integration service, and a third-party service, according to one embodiment. In one embodiment, the interactions 500 provide for an initial authentication/connection from a client device 501 to an internal platform (e.g., experimentation and/or program management platform of experiment system 502) to one or more third-party services (e.g., third-party service 506) via a third-party integration service (e.g., Ambassador 504).

In one embodiment, third-party integration may be turned on and off on the experiment system 502. Integration may be enabled and disabled for a third-party service completely, and/or on a project-level basis. In one embodiment, when integration is turned on for a particular third-party service and/or projection 508, the user may be prompted do enter the third-party service tenant URL. At 510, a access token may be sent to ambassador 504, which will in turn be used for future communications with the third-party service 506. User identify may be verified by sending the third-party access token to the third-party service 512, and in response the third-party service may redirect the user to a "grant access" interface 514. After receiving an indication that the user has granted access at 516, third-party service 506 redirects the user back to the application with the access token 518, thus authenticating the user for this and future communications with the third-party service 506. At 520, experiment system 502 calls ambassador 504 with a user ID for mapping to a user ID on the third-party service 506, as described herein. In one embodiment, ambassador 504 creates a table (e.g., in MySQL) to store information about the internal platform type (e.g., experimentation platform, program management platform, etc.), internal platform key, external platform type and external platform key.

In one embodiment, all communication between an external service or platform and an internal service or platform may go through the ambassador service. In another embodiment, a subset of communication may be routed through the ambassador service. In other words the ambassador service may act as a liaison for internal platforms (experimentation and ideation/program management platforms) to talk with external services and platforms.

In one example, any incoming and outgoing calls from and to ambassador 504 may include a JWT header for authorization purposes and this JWT token may include user identification information (e.g., user_model.unique_user_id), token expiration information, etc. In one embodiment, the JWT may be signed using a secret that may be stored in the configuration settings.

In one embodiment, service functions may call the ambassador service 504 with the external-platform endpoint linked in each point. The following are examples of JIRA functionality, merely as an exemplary embodiment, that may be enabled:

Listing of all the projects and issue types in JIRA: This function would be responsible for listing all the projects in the JIRA tenant.

Ability to fetch create meta from JIRA: This function would be responsible to return the metadata needed to create an issue in JIRA.

Creating new issues in JIRA. This service function would be responsible for creating a new JIRA issue with data about the required fields.

Creating new Feature flags from in JIRA: This will be used to create a new feature flag in JIRA based on the feature rollout information from the internal platform.

Ability to link existing JIRA Feature Flags with internal platform feature rollouts. This service will be used to update the feature flag information in JIRA.

Fetch information about feature flag: This service will be used to fetch information from the existing feature flag in JIRA.

Figure 6:
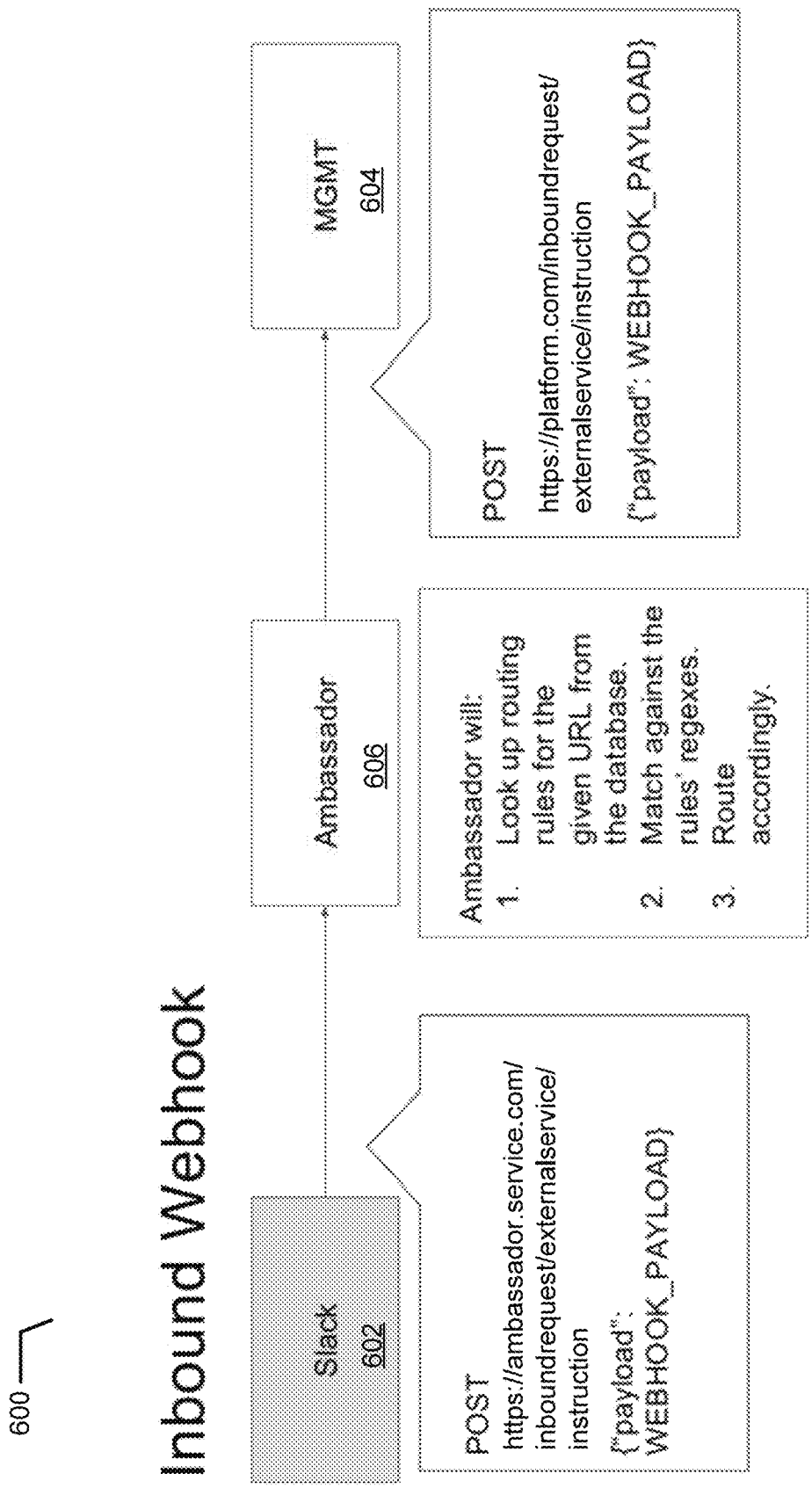
FIG. 6 is a transaction diagram illustrating an inbound interaction between a third-party service and a program management platform, according to one embodiment.
Figure 7:
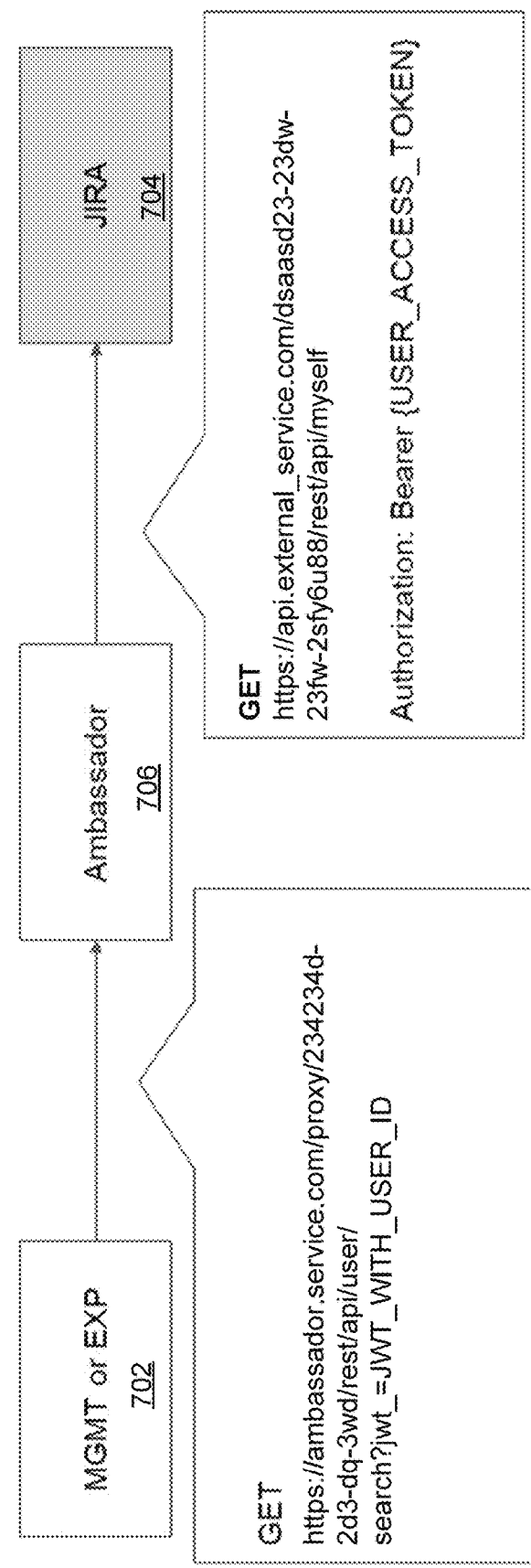
FIG. 7 is a transaction diagram illustrating an outbound interaction between a third-party service and a program management or experimentation platform, according to one embodiment.

Additional details describing inbound interactions after initial authentication will be provided in FIG. 6, and outbound interactions in FIG. 7.

FIG. 6 is a transaction diagram illustrating an inbound interaction 600 between a third-party service and a program management platform, according to one embodiment. The interaction 600 is provided with reference to third-party service, Slack, merely for convenience and brevity. The interaction 600 is equally capable to work with any other suitable third-party service. In one embodiment, an external service (e.g., Slack 602) sends a request to an internal platform (e.g., an experimentation and/or program management platform 604). In one embodiment, ambassador 606 intercepts the request and looks up the routing rules for the given URL (in the request) from an internal database and routes the request to the internal platform 604 accordingly.

FIG. 7 is a transaction diagram illustrating an outbound interaction between a third-party service and a program management or experimentation platform, according to one embodiment. The interaction 700 is provided with reference to third-party service, JIRA, merely for convenience and brevity. The interaction 700 is equally capable to work with any other suitable third-party service. In one embodiment, an internal platform (e.g., an experimentation and/or program management platform 702) sends a request to an external service (e.g., JIRA 704). In one embodiment, ambassador 706 intercepts the request and translates the request into a suitable API request for the external platform, and routes the API request to the external platform 704 accordingly.

Figure 8:
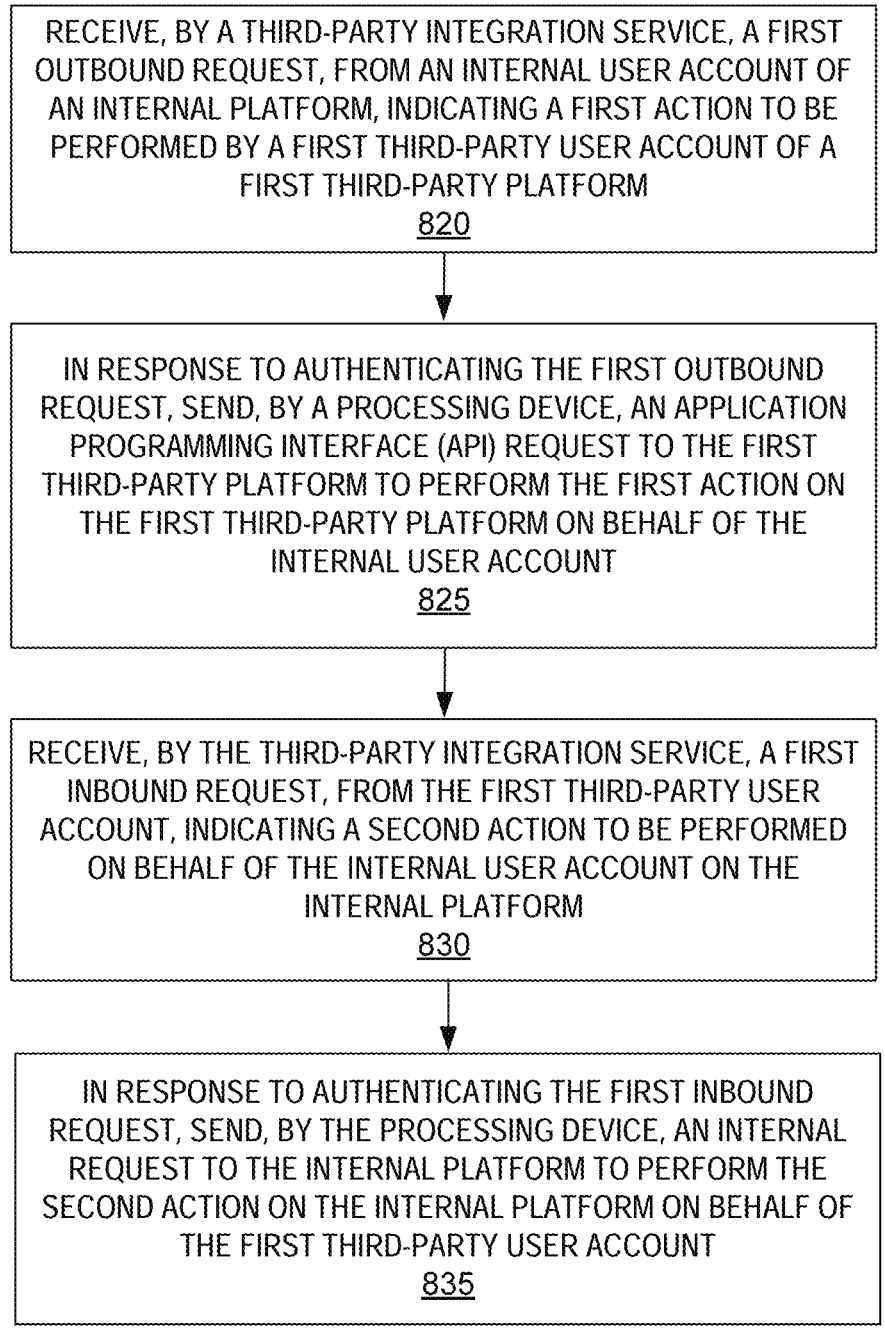
FIG. 8 is a flow diagram of a method of a third-party integration service, according to one embodiment.

FIG. 8 is a flow diagram of a method of a third-party integration service, according to one embodiment. Method 800 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 800 may be performed by client device experiment system 105 of FIG. 1. Some or all of the steps may be performed by other entities in other embodiments. In addition, other embodiments may include different and/or additional steps, and the steps may be performed in different orders.

Beginning at block 820, processing logic receives, by a third-party integration service, a first outbound request, from an internal user account of an internal platform, indicating a first action to be performed by a first third-party user account of a first third-party platform. At block 825, in response to authenticating the first outbound request, processing logic sends, by a processing device, an application programming interface (API) request to the first third-party platform to perform the first action on the first third-party platform on behalf of the internal user account. Processing logic may translate the first outbound request into the API request using a mapping table, machine learning, or by any other suitable method.

In one embodiment, at block 830, processing logic receives, by the third-party integration service, a first inbound request, from the first third-party user account, indicating a second action to be performed on behalf of the internal user account on the internal platform. In one embodiment the inbound request is received from the same third-party platform two which the outbound request was sent. In another embodiment, the inbound request is received from a different third-party platform to which the outbound request was sent. In this case the user account associated with the inbound and outbound requests may be different. In response to authenticating the first inbound request, processing logic at block 835 sends, by the processing device, an internal request to the internal platform to perform the second action on the internal platform on behalf of the first third-party user account. In one embodiment, to send the internal request to the internal platform, processing logic is to translate, by the third-party integration service, the first inbound request to the internal request using a mapping table, machine learning, or by performing any other suitable operations. Advantageously, one of many benefits associated with having the translation performed by the third-party integration service is that the backend platform that handles the request internally may be changed dynamically—e.g., without needing to change any frontend integrations with the third party service.

In one embodiment, to authenticate the first inbound request, the first inbound request includes an external authorization token, and processing logic is further to authenticate the first inbound request in view of (e.g., partially or fully based on) the external authorization token. In response to the authenticating, processing logic may send an internal authorization token with the internal request to the internal platform to perform the second action on the internal platform on behalf of the first third-party user account.

In one embodiment, processing logic determines the routing rules for an inbound URL specified in the inbound request and routes the internal request accordingly. For example, the internal platform may be one of an experimentation platform or a program management platform, and processing logic may further select the experimentation platform or the program management platform as a recipient of the internal request based on a type of the first inbound request according to the routing rules.

In one embodiment, the second action includes creating a record of the first inbound request and translating a data element from the first third-party platform to a data element in the internal platform. In another embodiment, the second action may alternatively, or additionally, include any other suitable action.

In one exemplary embodiment, the internal platform is an experimentation platform, and processing logic receiving a second outbound request, from an internal program-management user account of an internal program-management platform, indicating a third action to be performed by the first third-party user account of the first third-party platform. In response to authenticating the second outbound request, processing logic may send another API request to the first third-party platform to perform the third action on the first third-party platform on behalf of the internal program-management user account.

In one embodiment, to grant external authorization tokens for outbound requests and/or authenticate outbound requests, processing logic may identify the internal user account and encode a JavaScript Objection Notation web token (JWT) associated with the internal user account. In another embodiment, any other suitable type of token may be used. In response, processing logic may receive an external authorization token from the first third-party platform, store the external authorization token with the JWT, and associate the external authorization token with the internal user account. In one embodiment, before initiating the above authentication processing, processing logic may determine that a third-party token associated with the internal user account does not exist and identify the internal user account in response to determining that the third-party token does not exist. Advantageously, this may allow for future communications between the internal and external platforms, for the particular user, without reauthorization (e.g., until expiration or other revocation of the authorization token).

In one embodiment, before communication in enabled between internal and external platforms and services, processing logic may authenticate a user of the services and platforms. For example, in one embodiment, processing logic connects the first third-party user account of the first third-party platform with the internal user account of the internal platform in response to receiving a first request to connect. In one embodiment, the first request includes or otherwise indicates: an identifier (ID) associated with the first third-party user account, an ID associated with the internal platform, and/or an ID associated with the first third-party platform. Processing logic may then connect a second third-party user account of a second third-party platform with the internal user account of the internal platform in response to receiving a second request to connect. Likewise, the second request to connect may include or otherwise indicate: an identifier (ID) associated with the second third-party user account, an ID associated with the internal platform, and an ID associated with the second third-party platform, wherein the second third-party platform is different than the first third-party platform.

Figure 9:
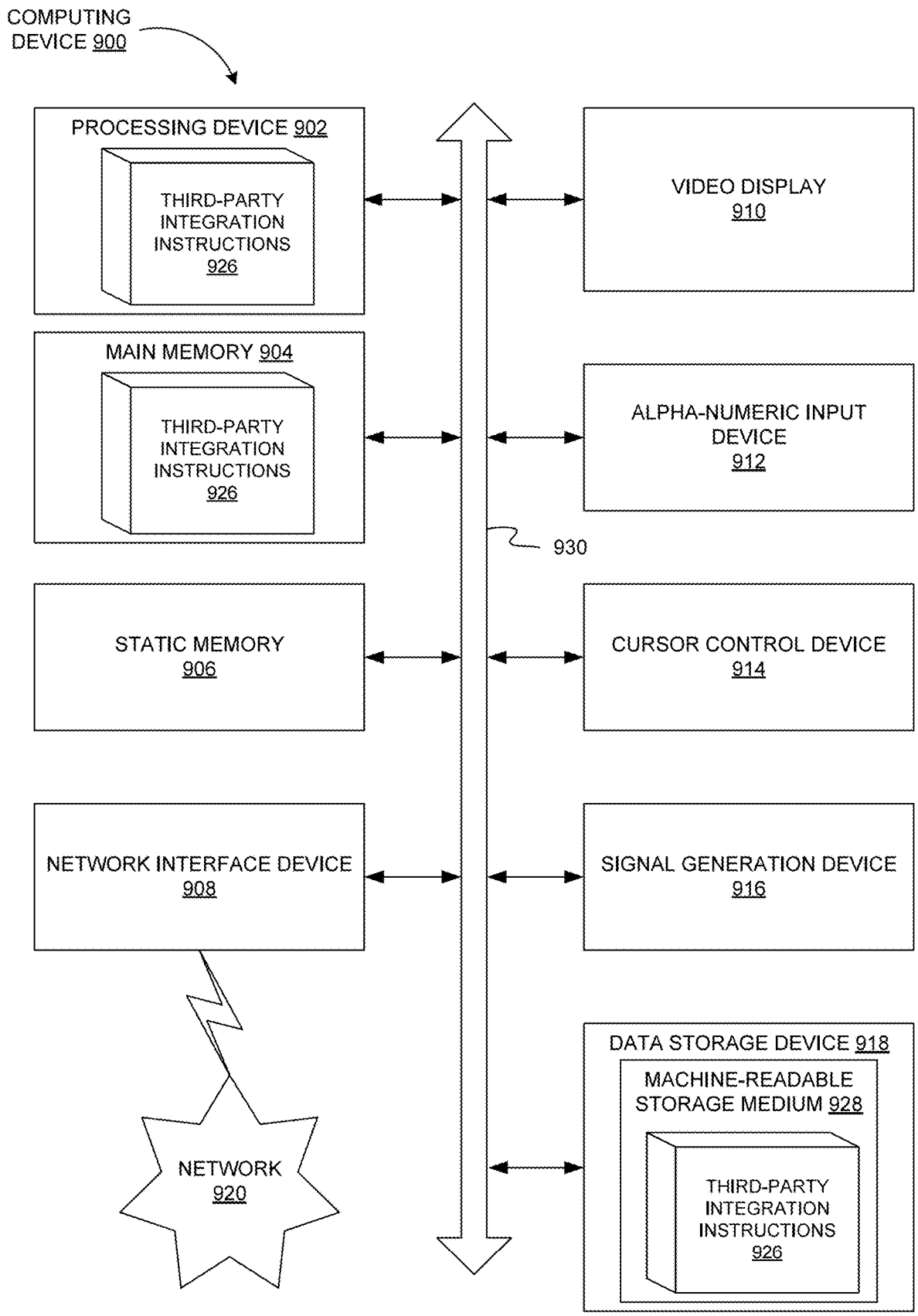
FIG. 9 is a block diagram of a computing device, in accordance with some embodiments of the present disclosure.

FIG. 9 is a block diagram of an example computing device 900 that may perform one or more of the operations described herein, in accordance with some embodiments. In various embodiments, computing device 900 may represent computing devices (e.g., servers) of the experimentation platform, third-party content provider client devices, and/or third-party content provider servers. Computing device 900 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 900 may include a processing device (e.g., a general purpose processor, a PLD, etc.) 902, a main memory 904 (e.g., synchronous dynamic random access memory (DRAM), read-only memory (ROM)), a static memory 906 (e.g., flash memory and a data storage device 918), which may communicate with each other via a bus 930.

Processing device 902 may be provided by one or more general-purpose processing devices such as a microprocessor, central processing unit, or the like. In an illustrative example, processing device 902 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 902 may also comprise one or more special-purpose processing devices such as an application specific integrated circuit (ASIC), a field programmable gate array (FPGA), a digital signal processor (DSP), network processor, or the like. The processing device 902 may be configured to execute the operations described herein, in accordance with one or more aspects of the present disclosure, for performing the operations and steps discussed herein.

Computing device 900 may further include a network interface device 908 which may communicate with a network 920. The computing device 900 also may include a video display unit 910 (e.g., a liquid crystal display (LCD) or a cathode ray tube (CRT)), an alphanumeric input device 912 (e.g., a keyboard), a cursor control device 914 (e.g., a mouse) and an acoustic signal generation device 916 (e.g., a speaker). In one embodiment, video display unit 910, alphanumeric input device 912, and cursor control device 914 may be combined into a single component or device (e.g., an LCD touch screen).

Data storage device 918 may include a computer-readable storage medium 928 on which may be stored one or more sets of instructions 926, e.g., instructions for carrying out the operations described herein, in accordance with one or more aspects of the present disclosure. Third-party integration instructions 926 may also reside, completely or at least partially, within main memory 904 and/or within processing device 902 during execution thereof by computing device 900, main memory 904 and processing device 902 also constituting computer-readable media. The instructions 926 may further be transmitted or received over a network 920 via network interface device 908.

While computer-readable storage medium 928 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
   receiving, at an integration service, a request for an external authorization token from an internal user account of an internal platform, the external authorization token identifying a first external user account of a first external platform, wherein the internal platform is an experiment system to transmit instructions to execute experiment variations of a web page to a client device;
   responsive to receiving the request for the external authorization token from the internal user account of an internal platform, generating a user interface to receive user input for an operation authorizing access to the first external user account of the first external platform;
   responsive to the operation authorizing access to the first external user account of the first external platform, receiving a request to connect the first external user account of the first external platform with the internal user account of the internal platform, the request to connect comprising: the external authorization token, an identifier (ID) that identifies the first external user account, an ID that identifies the internal platform, and an ID that identifies the first external platform;
   receiving, by the integration service, a first outbound request from the internal user account of the internal platform indicating a first action to be performed by the first external user account of the first external platform, wherein the first external platform is different from the internal platform;
   in response to authenticating the first outbound request, sending, by a processing device of the integration service, an application programming interface (API) request to the first external platform to perform the first action on the first external platform on behalf of the internal user account;
   receiving, by the integration service, a first inbound request from the first external user account of the first external platform indicating a second action to be performed on the internal platform by the internal user account;
   authenticating the first inbound request in view of the external authorization token; and
   in response to authenticating the first inbound request, sending, by the processing device of the integration service, an internal authorization token with an internal request to the internal platform to perform the second action on the internal platform on behalf of the first external user account, wherein sending the internal authorization token with the internal request to the internal platform comprises modifying a format of the internal request by translating the first inbound request from the first external user account of the first external platform to the internal request to the internal platform using a mapping table.

2. The method of claim 1, further comprising:
   connecting a second external user account of a second external platform with the internal user account of the internal platform in response to receiving a second request to connect, comprising: an identifier (ID) that identifies the second external user account, an ID that identifies the internal platform, and an ID that identifies the second external platform, wherein the second external platform is different than the first external platform.

3. The method of claim 1, further comprising:
   receiving a second outbound request, from an internal program-management user account of an internal program-management platform, indicating a third action to be performed by the first external user account of the first external platform; and
   in response to authenticating the second outbound request, sending another API request to the first external platform to perform the third action on the first external platform on behalf of the internal program-management user account.

4. The method of claim 1, wherein to authenticate the first outbound request, the method comprises:
   identifying the internal user account;
   encoding a JavaScript Objection Notation web token (JWT) associated with the internal user account;
   receiving the external authorization token from the first external platform;

storing the external authorization token with the JWT; and
associating the external authorization token with the internal user account.

5. The method of claim 4, further comprising:
determining that an external token associated with the internal user account does not exist; and
identifying the internal user account in response to determining that the external token does not exist.

6. The method of claim 1, wherein the internal platform is selected from a plurality of internal platforms, the method further comprising selecting the internal platform as a recipient of the internal request based on a type of the first inbound request.

7. A system comprising:
a memory to store a first inbound request and a first outbound request; and
a processing device, operatively coupled to the memory, to:
receive, at an integration service, a request for an external authorization token from an internal user account of an internal platform, the external authorization token identifying a first external user account of a first external platform, wherein the internal platform is an experiment system to transmit instructions to execute experiment variations of a web page to a client device;
responsive to receiving the request for the external authorization token from the internal user account of an internal platform, generate a user interface to receive user input for an operation authorizing access to the first external user account of the first external platform;
responsive to the operation authorizing access to the first external user account of the first external platform, receive a request to connect the first external user account of the first external platform with the internal user account of the internal platform, the request to connect comprising: the external authorization token, an identifier (ID) that identifies the first external user account, an ID that identifies the internal platform, and an ID that identifies the first external platform;
receive, by the integration service, the first outbound request from the internal user account of the internal platform indicating a first action to be performed by the first external user account of the first external platform, wherein the first external platform is different from the internal platform;
in response to authenticating the first outbound request, send an application programming interface (API) request to the first external platform to perform the first action on the first external platform on behalf of the internal user account;
receive, by the integration service, the first inbound request from the first external user account of the first external platform indicating a second action to be performed on the internal platform by the internal user account;
authenticate the first inbound request in view of the external authorization token; and
in response to authenticating the first inbound request, send an internal authorization token with an internal request to the internal platform to perform the second action on the internal platform on behalf of the first external user account, wherein to send the internal authorization token with the internal request to the internal platform the processing device is to modify a format of the internal request by translating the first inbound request from the first external user account of the first external platform to the internal request to the internal platform using a mapping table.

8. The system of claim 7, the processing device further to:
connect a second external user account of a second external platform with the internal user account of the internal platform in response to receiving a second request to connect, comprising: an identifier (ID) that identifies the second external user account, an ID that identifies the internal platform, and an ID that identifies the second external platform, wherein the second external platform is different than the first external platform.

9. The system of claim 7, the processing device further to:
receive a second outbound request, from an internal program-management user account of an internal program-management platform, indicating a third action to be performed by the first external user account of the first external platform; and
in response to authenticating the second outbound request, send another API request to the first external platform to perform the third action on the first external platform on behalf of the internal program-management user account.

10. The system of claim 7, wherein to authenticate the first outbound request, the processing device is to:
identify the internal user account;
encode a JavaScript Objection Notation web token (JWT) associated with the internal user account;
receive the external authorization token from the first external platform;
store the external authorization token with the JWT; and
associate the external authorization token with the internal user account.

11. The system of claim 10, the processing device further to:
determine that an external token associated with the internal user account does not exist; and
identify the internal user account in response to determining that the external token does not exist.

12. The system of claim 7, wherein the internal platform is selected from a plurality of internal platforms, the processing device further to select the internal platform as a recipient of the internal request based on a type of the first inbound request.

13. A non-transitory computer-readable storage medium including instructions that, when executed by a processing device, cause the processing device to:
receive, at an integration service, a request for an external authorization token from an internal user account of an internal platform, the external authorization token identifying a first external user account of a first external platform, wherein the internal platform is an experiment system to transmit instructions to execute experiment variations of a web page to a client device;
responsive to receiving the request for the external authorization token from the internal user account of an internal platform, generate a user interface to receive user input for an operation authorizing access to the first external user account of the first external platform;
responsive to the operation authorizing access to the first external user account of the first external platform, receive a request to connect the first external user account of the first external platform with the internal user account of the internal platform, the request to connect comprising: the external authorization token, an identifier (ID) that identifies the first external user account, an ID that identifies the internal platform, and an ID that identifies the first external platform;

receive, by the integration service, a first outbound request from the internal user account of the internal platform indicating a first action to be performed by the first external user account of the first external platform, wherein the first external platform is different from the internal platform;

in response to authenticating the first outbound request, send, by the processing device of the integration service, an application programming interface (API) request to the first external platform to perform the first action on the first external platform on behalf of the internal user account;

receive, by the integration service, a first inbound request from the first external user account of the first external platform indicating a second action to be performed on the internal platform by the internal user account on the internal platform;

authenticate the first inbound request in view of the external authorization token; and in response to authenticating the first inbound request, send, by the processing device of the integration service, an internal authorization token with an internal request to the internal platform to perform the second action on the internal platform on behalf of the first external user account, wherein to send the internal authorization token with the internal request to the internal platform the processing device is to modify a format of the internal request by translating the first inbound request from the first external user account of the first external platform to the internal request to the internal platform using a mapping table.

14. The non-transitory computer-readable storage medium of claim 13, the processing device further to:
connect a second external user account of a second external platform with the internal user account of the internal platform in response to receiving a second request to connect, comprising: an identifier (ID) that identifies the second external user account, an ID that identifies the internal platform, and an ID that identifies the second external platform, wherein the second external platform is different than the first external platform.

15. The non-transitory computer-readable storage medium of claim 13, the processing device further to:
receive a second outbound request, from an internal program-management user account of an internal program-management platform, indicating a third action to be performed by the first external user account of the first external platform; and
in response to authenticating the second outbound request, send another API request to the first external platform to perform the third action on the first external platform on behalf of the internal program-management user account.

16. The non-transitory computer-readable storage medium of claim 13, wherein to authenticate the first outbound request, the processing device is to:
identify the internal user account;
encode a JavaScript Objection Notation web token (JWT) associated with the internal user account;
receive the external authorization token from the first external platform;
store the external authorization token with the JWT; and
associate the external authorization token with the internal user account.

* * * * *